United States Patent
Barkley et al.

(10) Patent No.: US 6,202,066 B1
(45) Date of Patent: Mar. 13, 2001

(54) IMPLEMENTATION OF ROLE/GROUP PERMISSION ASSOCIATION USING OBJECT ACCESS TYPE

(75) Inventors: John Barkley, Darnestown, MD (US); Anthony V. Cincotta, Falls Church, VA (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/195,449

(22) Filed: Nov. 18, 1998

Related U.S. Application Data
(60) Provisional application No. 60/066,149, filed on Nov. 19, 1997.

(51) Int. Cl.[7] .................................................. G06F 17/30
(52) U.S. Cl. ........................................... 707/9; 713/200
(58) Field of Search .................................. 713/200; 707/9, 707/103; 380/25

(56) References Cited

U.S. PATENT DOCUMENTS

| | | | |
|---|---|---|---|
| 4,621,321 | 11/1986 | Boebert et al. | 707/8 |
| 4,701,840 | 10/1987 | Boebert et al. | 713/200 |
| 5,163,147 | 11/1992 | Orita | 707/9 |
| 5,173,939 * | 12/1992 | Abadi et al. | 707/9 |
| 5,202,997 | 4/1993 | Arato | 713/200 |
| 5,263,157 * | 11/1993 | Janis | 707/9 |
| 5,265,221 | 11/1993 | Miller | 711/163 |
| 5,276,901 * | 1/1994 | Howell et al. | 707/9 |
| 5,701,458 | 12/1997 | Bsaibes et al. | 707/9 |
| 5,720,033 | 2/1998 | Deo | 713/200 |
| 5,765,153 | 6/1998 | Benanter et al. | 707/9 |
| 5,768,504 | 6/1998 | Kells et al. | 713/201 |
| 5,787,427 | 7/1998 | Benantar et al. | 707/9 |
| 5,802,276 | 9/1998 | Benantar et al. | 713/200 |
| 5,809,506 | 9/1998 | Copeland | 707/103 |
| 5,903,720 * | 5/1999 | Stokes | 713/200 |
| 5,911,143 * | 6/1999 | Deinhart et al. | 707/103 |
| 6,023,765 * | 2/2000 | Kuhn | 713/200 |
| 6,044,466 * | 3/2000 | Anand et al. | 713/200 |
| 6,088,679 * | 7/2000 | Barkley | 705/8 |

* cited by examiner

*Primary Examiner*—Paul V. Kulik
(74) *Attorney, Agent, or Firm*—Michael De Angeli

(57) ABSTRACT

Security administration in a computer system is simplified by defining a new and independent entity called an Object Access Type (OAT). OATs comprise access control specifications associating roles with permissions, and associating the roles with a set of objects, such as resources or files. Different roles may have differing permissions to objects associated with an OAT, and objects may be assigned to plural OATs. A mechanism is also presented whereby system administrators are provided with the capability to display and manipulate access designations by operating only on the independent OATS.

10 Claims, 4 Drawing Sheets

IMPLEMENTATION OF ROLE/GROUP PERMISSION ASSOCIATION USING OBJECT ACCESS TYPE

CROSS-REFERENCE TO RELATED APPLICATION

This application claims priority from Provisional Patent Application Ser. No. 60/066,149 filed Nov. 19, 1997.

FIELD OF THE INVENTION

This invention relates to improvements in control of access to resources or objects within a computer system, that is, by incorporation of novel object access type control techniques.

BACKGROUND OF THE INVENTION

In many circumstances it is desired to restrict access to various objects, such as files, within a computer system. In the simplest example of access control, only certain persons are permitted to read the contents of a sensitive file. In a more general statement, "objects" may also include resources, such as peripheral devices, external devices controlled by the computer system (e.g., weapons, devices controlling physical access to secured locations, and the like), as well as files or groups of files, such as directories. Further, there are varying levels of "access"; for example, in many cases, it is desired that certain individuals may only read a file, but may not alter or delete it, while others have more general "permissions" with respect to that file.

The issue of access control to objects within a computer system also arises in systems of significantly varying configuration, and operated according to widely differing mechanisms. For example, local area networks typically comprise a number of individual processor devices, i.e. personal computers or "PCs", linked such that all share certain resources, such as a file server. Such networks are commonly operated under control of an "operating system", which may include the capability to provide varying individuals with varying "permissions" with respect to objects stored on the file server. For example, Microsoft Corporation's "Windows NT" operating system provides this capability, by associating an "access control list" ("ACL") (this being an example of an "access control specification", as the latter term is used in the art) with each "object", e.g., with each controlled file or group of files, i.e., with a directory of controlled files. Windows NT allows various permissions to be associated by the ACL with individuals or groups of individuals, so that the access sought is permitted only if the user's identification matches the a user entry in the ACL or the user is a member of a group entry in the ACL, and the user or group entry is associated with permissions for the access sought.

The issue of access control also arises in connection with relational databases, which may be accessed from a variety of processors not necessarily connected in a network operated by a single operating system per se; access control lists are then typically associated with portions of the database and operated similarly.

The question of access control also arises in connection with objects stored such that they can be accessed over the "Internet" or "Web", i.e., such that they can be located by universal resource locator ("URL") inquiries; the "servers" storing the resources sought may similarly store ACLs for restricting access to various objects to individuals or groups of individuals.

Stated more generally, therefore, access control mechanisms, e.g., as effectively defined by an operating system such as Windows NT, require that security attributes be maintained concerning both users and objects. User security attributes may consist of defined groups ("roles") to which the user belongs, wherein access to various objects is permitted to all of the individuals identified as members of the group; this technique, which simplifies the assignment of permissions to users with respect to various objects by assigning various individuals to groups according to their status, is commonly referred to as "Role-Based Access Control" ("RBAC"); see co-pending Ser. No. 08/980,908, of one of the present inventors, incorporated herein by this reference.

Object security attributes generally consist of the permissions required to perform operations on the object. Access control mechanisms provided by the computer system—again, which terminology includes relational databases and the Web as well as local area networks and the like—compare user security attributes and object security attributes in order to determine access.

In each of the typical types of computer systems discussed above, object security attributes are usually kept with the object (e.g., in the header of a file) and the object resides in (or a resource is accessed through) a single server. Consequently, when an object is accessed, its security attributes can be conveniently evaluated once the object has been located. Furthermore, changes in object security attributes—e.g., to add or subtract an individual from those having access of a specified type to a particular object—need only be made at a single location.

Administering users' access to resources is often accomplished by directly associating users with permissions, that is, by providing an ACL with respect to each object or, at best, groups of objects already organized in some known way, i.e., as files within a directory. This approach can be particularly difficult, error-prone, and costly to administer when users enter and leave an organization and when users' responsibilities change within an organization, because each ACL must then be correctly altered. Comparable difficulties arise in connection with changes involving the control of access to a relational database, wherein the resources are equivalent to tables, and the access control information amounts to a list of operations that each individual (or role member) may perform.

As noted above, user access control mechanisms have been designed to address these problems and simplify the process of effectuating changes in the status of individuals and objects by the use of "roles", whereby individuals may be organized conveniently into groups, such that each member of a particular groups is accorded the same set of permissions with respect to a group of associated objects. In effect, such Role Based Access Control (RBAC) mechanisms provide a mechanism whereby individuals may be assigned to groups; the group is then listed on an Access Control List (ACL) associated with an object or group of objects.

The central notion of Role-Based Access Control (RBAC) is that users do not have discretionary access to enterprise objects. Instead, access permissions are administratively associated with roles, and users are administratively made members of appropriate roles. This idea greatly simplifies management of authorization while providing an opportunity for great flexibility in specifying and enforcing enterprise-specific protection policies. Users can be made members of roles as determined by their responsibilities and qualifications and can be easily reassigned from one role to another without modifying the underlying access structure. Roles can be granted new permissions as new applications and actions are incorporated, and permissions can be revoked from roles as needed. Furthermore, most RBAC mechanisms support the idea of heirarchical groups, i.e., where a member of "manager", for example, automatically obtains all permissions provided to "subordinate".

By comparison, the basic idea of conventional ACLs is to associate an object (or group of objects, such as a "directory" of "files", in Windows parlance) with a list of users and groups. Associated with each user or group in an ACL for an object is a set of operations which may be performed on that object. An operation on the object may be performed by a user if that user or a group to which that user belongs is listed in the ACL associated with the object and that operation is associated with that user or group. Windows NT is one well-known operating system which supports such ACL mechanisms. However, while as noted Windows NT does allow assignment of groups to ACLs, heirarchical permissions are not supported. "PASC P1003.le" is an IEEE specification for an operating system interface which similarly supports ACLs.

Adding implementation of RBAC provides several advantages over simply controlling access to objects by ACLs. Even a very simple RBAC model affords an administrator the opportunity to express an access control policy in terms of the way that the organization is viewed, i.e., in terms of the roles that individuals play within the organization. With RBAC, it is not necessary to translate a natural organizational view into another view in order to accommodate an access control mechanism. In addition, most RBAC models have features which most ACLs do not. In particular, as noted above, many RBAC models support role hierarchical organization of roles, where one role can "inherit" the permissions accorded another.

Thus, by associating permissions with roles or groups and by moving users in and out these roles or groups, the complexity of permission assignment administration can be reduced, lowering the total cost of security administration and improving its reliability. Thus, RBAC simplifies the problem of maintaining user access control.

There is, however, no comparable mechanism for simplifying object access control. In the prior art, object access control is handled resource by resource; more specifically, in NT and other operating systems, an access control list is not itself treated as an independent entity that might be associated with a file or group of files, but is simply an attribute of the file's definition. Accordingly, changes must be made resource by resource. This can be a significant task for a system administrator, and, again, errors amount to breaches of the security system.

The basic architecture of the ACL mechanism is shown by U.S. Pat. Nos. 4,621,321 and 4,701,840 to Boebert, which also draw a distinction between ordinary and distinguished objects in a computer system.

Prior art patents further exemplifying such practices, and in some cases pointing out the difficulties and shortcomings thereof, include U.S. Pat. No. 5,720,033 to Deo, U.S. Pat. No. 5,265,221 to Miller, and U.S. Pat. No. 5,787,427 to Benantar, all showing assignment of a number of objects requiring common access control lists to groups.

Also generally pertinent to issue of access control in a computer system are U. S. Pat. No. 5,701,458 to Bsaibes; U.S. Pat. Nos. 5,802,276 and 5,765,153 to Benantar; U.S. Pat. No. 5,809,506 to Copeland; and U.S. Pat. No. 5,768,504 to Kells. U.S. Pat. No. 5,163,147 to Orita discusses the "level" concept of computer security (see U.S. Ser. No. 08/975,189, now U.S. Pat. No. 6,023,765 for disclosure of a method for incorporating RBAC into such a system). Finally, U.S. Pat. No. 5,202,997 to Arato relates to control of peripherals.

With the role or group approach to security administration, much of the effort in providing administrative tools has been devoted to tools, such as RBAC, for associating users with roles or groups. As noted above, although operating environments typically used in access control management applications, for example Windows NT, do not have a general mechanism for group hierarchies, the use of hierarchies in administering the relationships between users and roles or groups can significantly reduce administrative costs by allowing access control to be defined with respect to such roles or groups of individuals.

As noted above, there is at present no mechanism available for analogously assigning access control status to collections of objects, apart from the capability of assigning ACLs to directories. Hence significant difficulties arise in connection with access control to objects or groups of objects.

OBJECTS OF THE INVENTION is therefore an object of the invention to provide more convenient, less costly control of access to objects within a computer system by introducing an object-based access control method and a management tool with which to implement and administer the method.

It is a further object of the invention to provide methods whereby an object-based access control method may be employed to provide convenient access control to objects stored at various locations.

It is a further object of the invention to provide improved security by reducing the occurrences of unauthorized access to information by implementing object access type methodology rendering access control more reliable in use.

It is yet another object of the invention to apply independent entity access control mechanisms to computer networks, relational databases, and to objects accessed over the Internet, i.e., the Web.

SUMMARY OF THE INVENTION

The present invention introduces the concept of an "Object Access Type" and describes a software tool, "RGP-Admin", for using Object Access Types to administer associations between roles or groups and permissions. The Object Access Types are useful in connection with most RBAC and ACL mechanisms.

More specifically, according to the present invention, a separate entity, called an Object Access Type (OAT), is defined as an access control information specification for network, Web and relational database environments. The OATs are then manipulated as an entity separate from the objects—such as resources—with which they may be associated. OATs can be created, edited, deleted, and assigned to or removed from objects. Each OAT thus defines an access control specification, which in turn associates a list of individuals, or roles (e.g., branch manager, financial advisor, teller, and employee, in a bank environment) in a system inplementing RBAC, with corresponding sets of permissions provided with respect to a corresponding list of objects. The same users can then be given the same permissions with respect to an additional object simply by adding that role, assigned to those users, to the corresponding OAT; similarly, if the status of a given object is to be changed, it need simply be reassigned from one OAT to another more appropriate OAT.

For example, in many cases it is desirable for those designated as members of a first role to be given a first level of access or permissions to a first set of files or objects, while those designated to a second role are granted a different second level of access to the same set of files. An OAT is then created associating the first role with the first level of permissions, and the second role similarly with the second. The OAT is then assigned to the appropriate groups of objects, effectively implementing the desired permission scheme.

It will be apparent that changes in the status of individuals can be made by changing their role assignment(s), that is, as usual in RBAC. However, according to the invention, changes in the status of a document can be made by reassigning it from one OAT to another, or by changing the access control specifications of the corresponding OATs. Similarly, changes in the permissions granted to a particular role can be implemented simply by changing the access control specification of the corresponding OATs, and alteration of the permissions provided with respect to a group of objects (e.g., upgrading a security level required to access the objects) can be made by assigning the objects to a different OAT.

Another significant aspect of the invention lies in the tools provided to the system administrator to use the OAT concept. Apart from an OAT Editor using the usual tools provided by the operating system to manipulate the OATs as separate entities, an OAT Viewer also provides a series of coded displays that enable the ready verification of permissions being provided; these may comprise a first display identifying which OATs are assigned to which resources, and a second display indicating the permissions which are granted to members of the various roles with respect to the corresponding resources.

BRIEF DESCRIPTION OF THE DRAWINGS

The invention will be better understood if reference is made to the accompanying drawings, in which.

DESCRIPTION OF THE PREFERRED EMBODIMENTS

Figure 1:
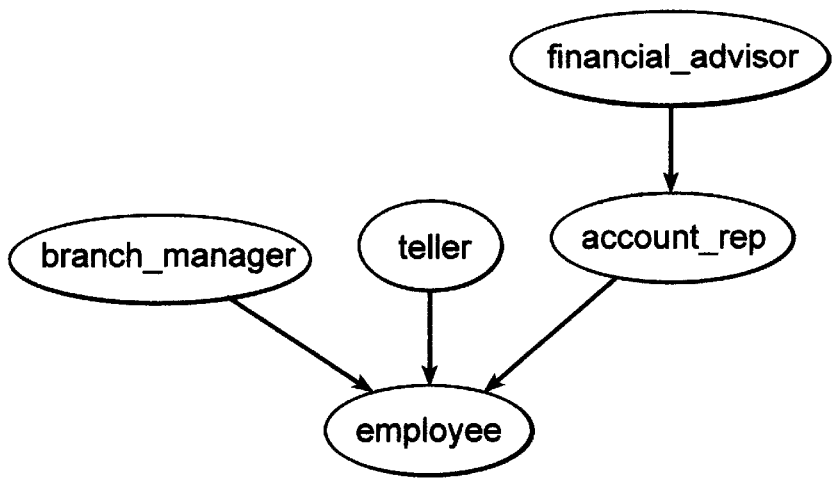
FIG. 1 is a block diagram showing the role/group relationships for a simplified banking organization.

The following definitions of terms used herein are provided for the convenience of the reader, and are not to be construed to limit the invention.

Access: The capability of a user to operate on an object.

Access Control: a technique used to define or restrict the rights of individuals or application programs to operate on an object, e.g., to obtain data from or place data into a storage location, or to operate a periperal or other resource.

Access Control List: A list associating a set of permissible operations that may be performed on an object by a user or group.

Group: a set of individuals having the same responsibilities.

Hierarchy: A set of roles having strict partial ordering wherein one role can be included in another role.

Inherit: The act of one role assuming the authorizations of another role.

Mechanisms: A formalized methodology or set of relationships, e.g., as implemented by a computer system.

Network: A computer entity comprising a plurality of servers.

Object: A passive entity that contains or receives information.

Object Access Type: A novel entity, implemented by an access control specification, that may be created, deleted, edited, written to, or read from, storing information assigning permissions to individuals or groups of individuals, and to which resources may be assigned, whereby the individuals or groups of individuals are associated with specific permitted modes of access to a set of one or more protected resources.

Operating Environment: A combination of host software implementing an enterprise application.

Operating System: A software program that manages the basic operation of a computer system.

Permission: An authorization granted to a user defining the nature of interactions that the user can have with an object.

Resource: Anything used or consumed while performing a function. The categories of resources are time, information, objects, or processors.

Role: A job function within an organization, defined by the authorities and the responsibilities of the function.

Role-Based Access Control: An access control mechanism whereby roles are created based on responsibilities, roles are associated with permissions necessary to those responsibilities, and the roles are associated with individuals.

Security Attributes: Descriptions of the affiliations between users and their authorized roles, or between permissions and the authorized operations on specified objects.

Servers: Shared computers connected by a network.

Subject: An active entity, generally in the form of a person, process, or device, that causes information to flow among objects or changes the system state.

User: Any person who interacts directly with a computer system, or a computer process which may or may not represent a person.

A permission can thus be described as authorization to perform an operation on an object, while an access control policy which uses roles or groups defines an association between a role or group and the permissions for that role or group.

This association can be represented as a 3-tuple:

(role or group; object; {permitted operations on object})

That is, a user assigned to role (or a member of group) is authorized to perform operation on object only if operation is a member of the set of permitted operations.

This representation is isomorphic to a representation of the form:

(object; role or group; {permitted operations on object})
where the first and second elements of the 3-tuple are interchanged.

In this equivalent representation, for each object, there is a list of roles or groups and associated permitted operations for those roles or groups with respect to that object. This list is the role—or group-based access control information for the object. This information—that is, the set of permissions and associated users—may be different for each object; as noted above, in conventional access control methods, each object (or at most, a group of associated objects, such as a directory of files) has its own access control list. However, for many objects this information —again, the set of permissions and associated users—may be the same. Recognizing that access to many objects can be controlled identically, the present invention provides a simple mechanism for thus associating groups of objects with sets of permissions and of users, organized as roles or groups; access control to objects is thus significantly simplified and thus made more reliable.

According to the invention a novel type of entity referred to as an "Object Access Type" ("OAT") is defined. Broadly speaking, an OAT describes an access control specification, and provides a mechanism for mapping permissions authorized with respect to various objects to the corresponding identified individuals or groups. More specifically, the OATs provided according to the invention map identified individuals or groups to the permissions authorized for those individuals and groups. When an OAT is associated with an object or set of objects, the user is granted access to the objects according to the permissions mapped to the user or to the role or group assigned to the user within the OAT. The OATs can be manipulated as independent entities separate from the objects with which they are associated; that is, the OATs can be created, edited, deleted, assigned to objects, and removed from objects. Users, typically organized by assignment to roles or groups, can be assigned various sets of permissions by the OATs; stated differently, different users may be assigned different permissions by the OAT, but each user obtains the same permission with respect to all objects assigned to that OAT.

The assignment of permissions and associated users to objects by the OAT mechanism has numerous advantages. As mentioned above, in RBAC, changes in the status of individuals can conveniently be implemented with respect to a number of objects by changing their role assignment(s); however, RBAC still requires each object to be separately thus assigned to one or more roles.

According to the invention, changes in the status of a document, for example, can be implemented by reassigning it from one OAT to another, or by changing the access control specifications of the corresponding OATs. Similarly, changes in the permissions granted to a particular role can be implemented simply by changing the access control specification of the corresponding OATs, and alteration of the permissions provided with respect to a group of objects (e.g., upgrading a security level required to access the objects) can be made by assigning the objects to a different OAT.

Use of the OATs to control access to objects is explained below with reference to a simple example, after explanation of the tools whereby the OATs are implemented and monitored.

More specifically, another significant aspect of the invention lies in the tools provided to the system administrator to use the OAT concept. An OAT Editor allows a system administrator to use the conventional methods supported by the operating system to manipulate the OATs as separate entities. An OAT Viewer also provides a series of user interface screens, that is, formatted displays that enable the ready verification of permissions being provided; these may comprise a first user interface identifying which objects are assigned to which OATs, and a second display indicating which roles have access to which sets of objects within the OATs.

In one implementation of the invention within the Windows NT operating system, a management software tool, RGP-Admin, controls the association of roles or groups and permissions by means of the OAT mechanism, and allows their monitoring through views of the OATs, the roles or groups, the objects, and the permissions granted.

More specifically, RGP-Admin:

Provides a convenient mechanism for defining OATs;

Provides views of associations between OATs and objects;

Provides views of associations between roles or groups, and the permissions granted to each with respect to the various objects;

Allows a system administrator (or similar) to assign an object to one or more OATs, or remove it therefrom; and Defines, saves, and recalls OATs and OAT collections.

In the Windows NT implementation mentioned, RGP-Admin manages stores of OATs which can be associated with objects, and writes the permissions and users (or roles) associated with each objects to the access control lists thereof; that is, the OAT in this implementation serves as a highly sophisticated mechanism for maintaining the conventional ACLs of all the objects assigned to the OAT. However, the OATs could be implemented in different ways; for example, ACLs treated as separate portions of the object (i.e., as conventional) could be dispensed with completely, and access to a given object permitted only if an OAT assigned to that object itself indicated that the requestor was a member of a role having been assigned the permission sought with respect to the object.

In the preferred embodiment, RGP-Admin has three principal user interface displays corresponding to three main functions: these are referred to as the Object Access Type View, the Object Access Type Editor, and the Role/Group Permission View.

Figure 2:
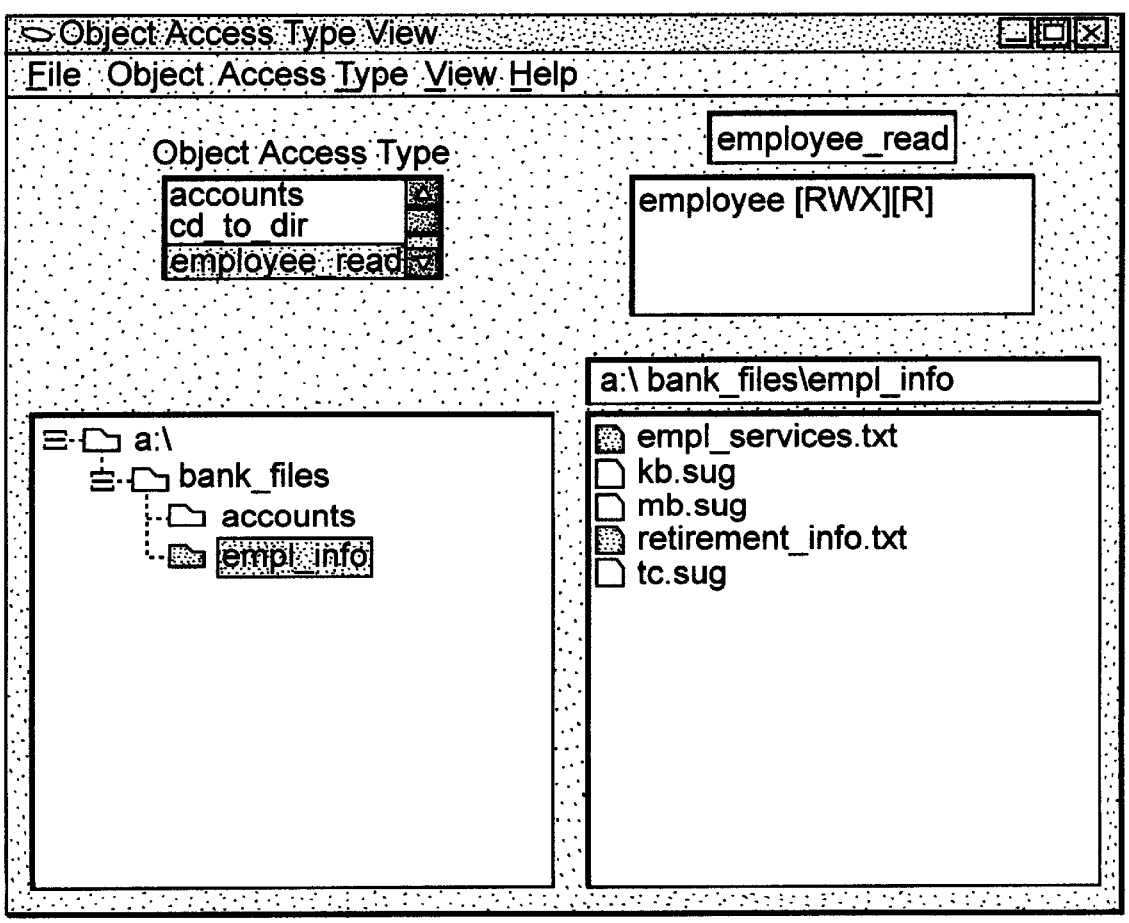
FIG. 2 is an example illustrating how icon symbolism is used in an Object Access Type View window to indicate which files have or do not have a particular OAT designation, again, in the banking example.

The Object Access Type View allows the OAT assignments to be viewed by selecting an OAT and a set of objects. FIG. 2 (discussed below) is an example of an Object Access Type View display window related to a simple banking example set forth below. For each object in the selected set, Object Access Type View displays an object icon (on, for example, a system administrator's display device) including an identifier such as a color or symbol indicating access control information about that object. For instance, the object icon may appear in green, if the access control information corresponding to the object includes the selected OAT, or red otherwise.

In a further aspect of the invention, if the selected OAT is set to a selected object and, optionally, to objects "inherited" by that object (e.g., in Windows NT, a directory contains or "inherits" files), the object is displayed red; if the OAT is removed from a selected object and, again optionally, to objects inherited by that object, the object is displayed as green. The Object Access Type View also creates, saves, and recalls OAT collections, and obtains the access control information for an object and adds it to an OAT collection when appropriate.

The Object Access Type Editor provided by RGP-Admin in the preferred embodiment of the invention allows convenient creation and editing of OATs by allowing a system administrator to add or remove a role or group from the OAT, to modify the permissions associated with that role or group, to assign objects to OAT designations or remove OATs from objects. The OAT Editor screen is illustrated in FIG. 3, again set in a bank organization context, and described in more detail below.

Figure 4:
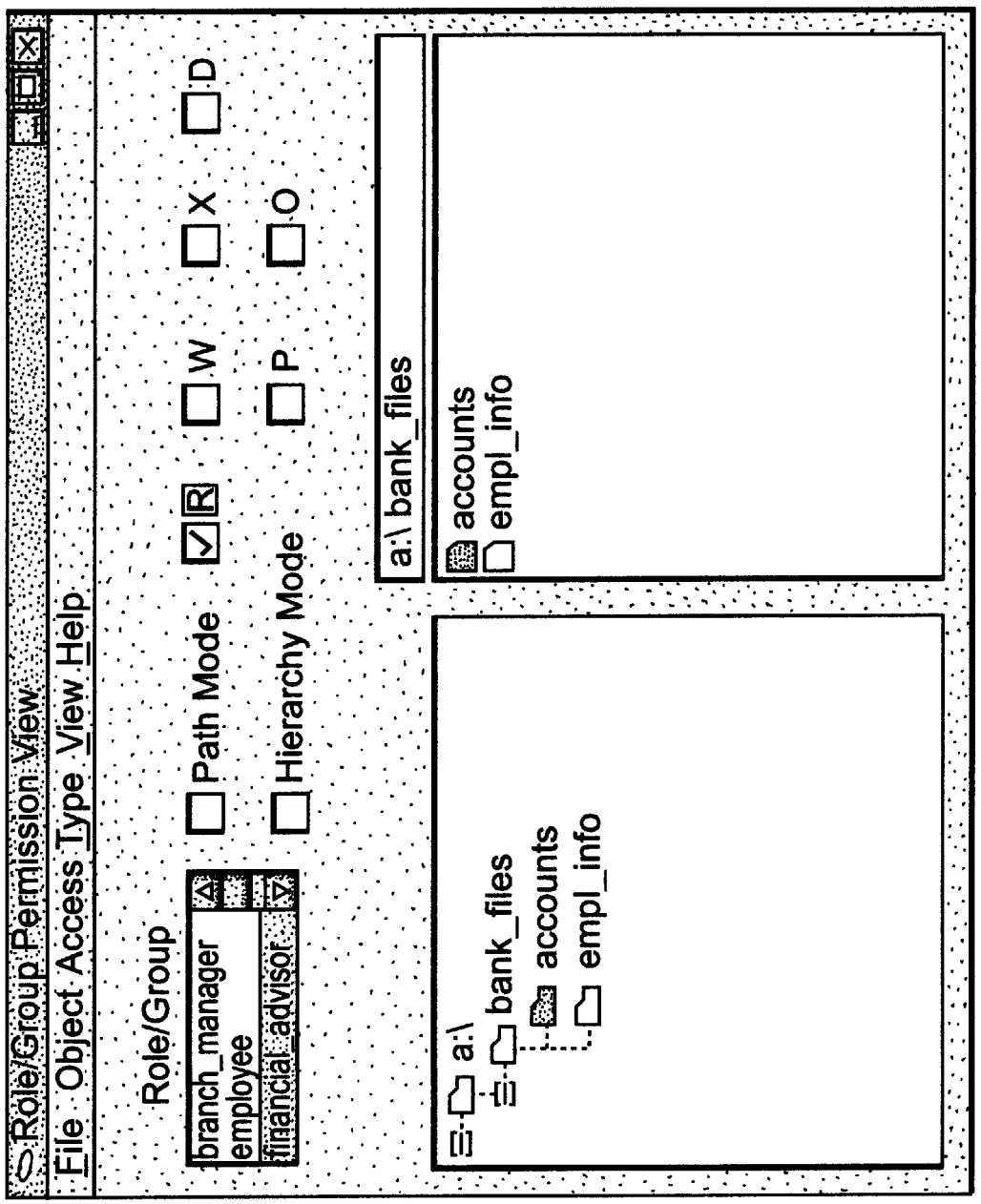
FIG. 4 is an example illustrating how icon symbolism is used to indicate the permissions associated with selected roles/groups in a Role/Group Permission View window.

The Role/Group Permission View screen shown in FIG. 4 displays the access permissions associated with selected objects for a selected role or group and graphically displays object access by role or group, in order to allow verification of the access permissions set by means of the Object Access Type View, as above, or by another tool, such as Windows NT Explorer. More specifically, as noted above, object access may conveniently be defined according to the invention by means of OATs using the Object Access Type View. However, when an OAT definition is not required, e.g., the number of objects to be set to specific access control information is small, then tools other than RGP-Admin might be used to set the access control information.

Different kinds of access, that is, different sets of permissions, may be displayed to illustrate 1) those objects as to which a selected role or group has a specific selected permission and 2) those objects to which a selected role or group has any access. The first question is posed, e.g., by a system administrator, by selecting a set of objects, a role or group, and specific permissions. RGP-Admin then answers by displaying the object icon for each object in the selected set, in a first manner, e.g., in green, if the selected role or group has all of the selected permissions, or in a differing manner, e.g., in red, if the selected role or group does not have all of the selected permissions. The second question is posed by selecting a set of objects and a role or group, and by leaving all specific permissions unselected. For each object in the selected set, RGP-Admin displays the object icon in a third way, e.g., in blue, if the selected role or group has any access, i.e., any permission to access the object, or red, if the selected role or group has no access to the object.

Although such color-coded icons represent a simple and effective means for distinguishing different levels of access, it will be recognized that any readily distinguishable symbol or convention could be employed; in the monochromatic drawings forming part of this application, icons which appear green on a display in the actual implementation are shown solid, and those which are actually red are shown in outline. The drawings do not include any which would be blue.

The capability for one role to inherit another role—that is, for example, while members of "manager" have their own permissions, they may also inherit those of "subordinate"—is a common feature of RBAC models. Such a "role hierarchy" is implemented by a strict partial ordering on the set of roles. One can think of role inheritance as the capability for one role to be authorized for (or "included in") another role.

An equivalent concept implemented in various access control systems implementing ACLs is the capability for one group to be a member of another group. In other words, "role a inherits role b" is equivalent to "role a is authorized to perform role b" or "group a is a member of group b."

It is important to know whether a given role or group effectively has access to an object. When organization of roles or groups into hierarchies is supported, access of a role or group to a given object may be provided either as a result of the permissions associated with that role or group, or as a result of the given role or group inheriting the permissions of some other role or group that has permission to access the object. It can also be important to know whether access is provided to the object as a result of the permissions defined for the role or group itself or is based on permissions associated with inherited roles or groups.

Figure 5:
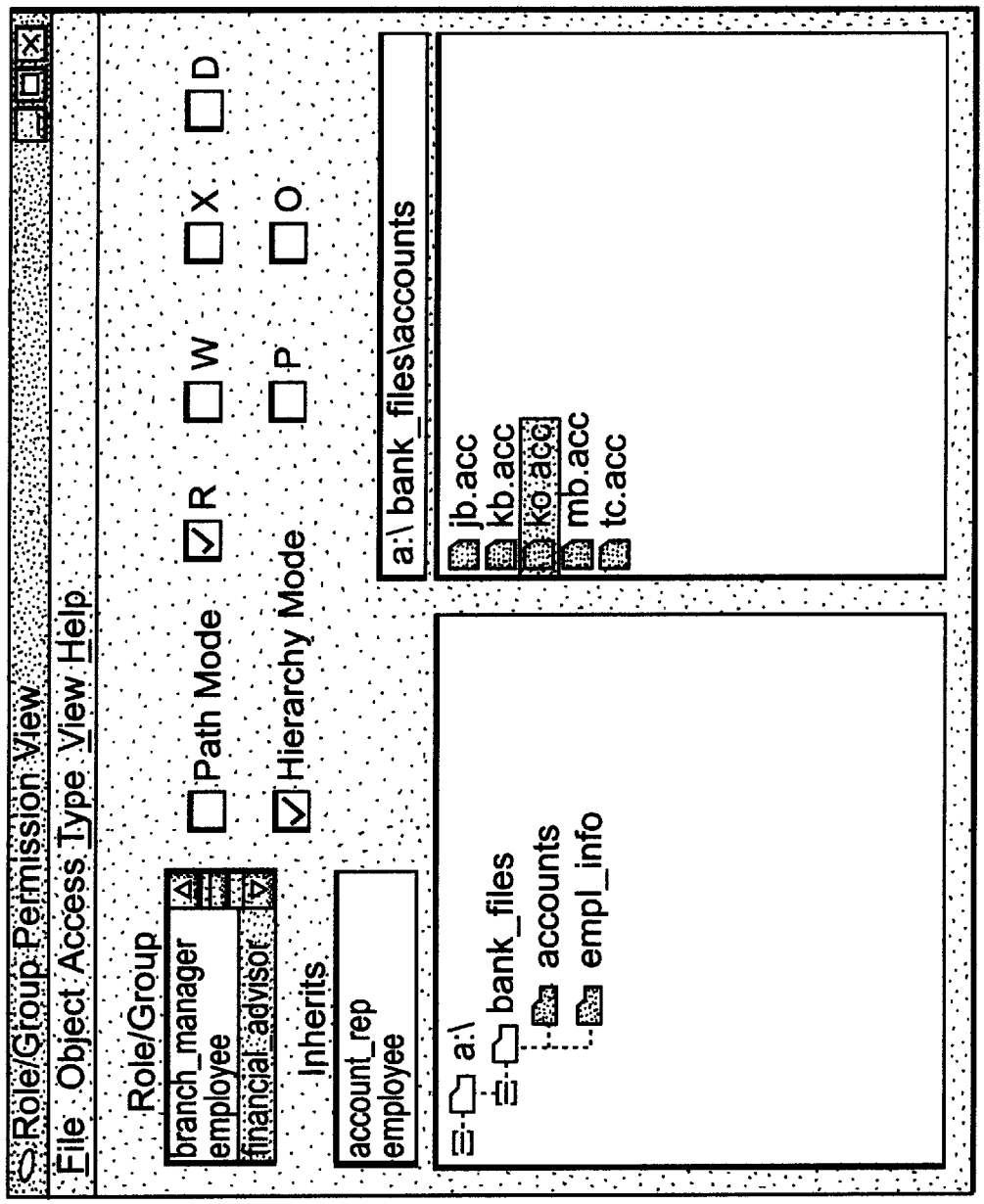
FIG. 5 is a second version of the Role/Group Permission View window of FIG. 4, illustrating how heirarchical permissions are indicated.

The Role/Group Permissions View illustrated in FIGS. 4 and 5 supports either a hierarchy or non-hierarchy mode. It will be observed in FIG. 4 that a "Heirarchy Mode" box is provided, so that the system administrator can distinguish between directly granted or inherited permissions. If the hierarchy mode is selected, then questions 1) and 2) addressed above are answered based on the effective access of the selected role or group, i.e., based on the permissions authorized for the selected role or group and any of its inherited roles or groups. FIG. 5 shows another version of the Role/Group Permission View, depicting permissions obtained through operation of a heirarchy, i.e., where one role inherits the permissions of another. In addition, the roles or groups inherited by the selected role or group are displayed. If hierarchy mode is not selected, then these questions are answered based only on the permissions directly authorized for the selected role or group.

Objects, such as files and processes, can also be organized into hierarchies. In such object hierarchies, it is important to know not only the access of a role or group to an object, but also to know whether the path in the hierarchy to the object can be traversed, that is, whether the user seeking a particular permission with respect to an object belongs to a role having that permission to all intermediate objects in the path. (In the Windows NT environment, for example, this typically amounts to determining whether the user has access to all the the directories "above" the subdirectory in which a particular file is located.) The capability of evaluating the path is provided in the Role/Group Permission View by a box allowing the "Path Mode" to be selected for controlling the display. If path mode is selected, questions 1) and 2) are answered for objects in the hierarchy not shown as end nodes (that is, which are intermediate other other objects in the path) based on whether the selected role or group has permission to traverse these intermediate nodes. Nodes in the hierarchy shown as end nodes are displayed normally. If Path Mode is not selected, then the questions are answered for all nodes based on the selected role or group. Note that when no permissions are selected, Path Mode is irrelevant since the permission to traverse an intermediate node is included in the concept of any access.

A simple OAT/RGP-Admin embodiment for a Windows NT environment is described below to illustrate the implementation and characteristics of the present invention. Typical roles/groups in a simple banking environment are shown in FIG. 1. The arrangement shown illustrates that all members of the roles branch_manager, teller, and account-rep are also members of employee, and thus would have their own set of permissions, as well as those assigned to employee; financial_advisor also inherits the permissions of account_rep, but may also have additional permissions.

In this case the objects are NT File System (NTFS) files or directories, the Object Access Types (OATS) are NTFS ACL specifications, and the possible Permissions are the usual NTFS file permissions: Read(R), Write(W), Execute (X), Delete(D), Change Permissions(P), and Take Ownership(O).

Windows NT Explorer uses a pair of parenthesized permission lists for describing file and directory permissions, respectively. This notation is also used in RGP-Admin. Table 1 shows the permissions asigned to each of the roles with respect to several OATs, to which the objects are assigned. For example, branch-manager has permissions "(RX)" and "(R)" for the OAT accounts. Accordingly, members of branch-manager have Read and Execute permission as to all files assigned to the OAT accounts, but only Read permission for directories within accounts. Similarly, if a new directory or file is created and assigned to the OAT accounts, then the members of branch-manager will obtain the same access thereto.

TABLE 1

| Role/Group | Object Access Type | | | |
|---|---|---|---|---|
| | accounts | cd_to_dir | employee_read | suggestions |
| account_rep | (WX) (RD) | (X) ( ) | | |
| branch_manager | (RX) (R) | (X) ( ) | | (R) (D) |
| employee_ | | (X) ( ) | (RWX) (R) | (X) (R) |
| financial_advisor | (R) ( ) | (X) ( ) | | |
| teller | (X) (RW) | (X) ( ) | | |

Table 1 thus illustrates a typical method of providing employees of varying responsibility, where the roles/groups and their hierarchy are as shown in FIG. 1, with appropriate access to various files maintained by the bank's computer system (typically a local area network of PCs running the Windows NT operating system), such as files related to depositor account information and employee information.

The roles/groups branch_manager and teller are two that one might expect at a bank's branch office. The role/group account_rep is authorized for the bank's account representatives who sit at the desks outside of the teller windows. The role/group financial_advisor is authorized for an account representative who is trained in recommending non-insured investment products. The role/group financial_advisor inherits the permissions of account_rep because financial_advisor needs to be able to open and close accounts. The roles/groups account-rep, branch_manager, financial_advisor, and teller similarly inherit the permissions of the role/group employee since any user authorized for these roles/groups is a bank employee.

In the example, role/group permissions defined for each of four Object Access Types (OATs) according to the invention are shown in Table 1, as follows. The OAT accounts applies to files that contain individual account information and to directories that hold such files. Various roles have varied permission with respect to these files; for example, only the members of account_rep can close an account, as no other roles have the permission (D). The OAT cd_to_dir provides all roles/groups with the capability of traversing a directory in order to access files in the directory. The OAT employee-read applies to files readable by all employees and to directories which contain employee related files. Finally, as to the OAT suggestions, all employees need to be able to write files to such directories in order to create suggestion files containing suggestions for more efficient bank operations, but only members of branch_manager can delete these files.

The permissions granted to each role with respect to various objects by the OATs are designed to implement bank policy. In a more specific example, the permissions granted to members of account_rep for each of the Object Access Types to effectuate bank policy may be implemented as follows:

The role/group account_rep must be able to create and delete account files; thus, account_rep has permission to traverse and write into the accounts directory, and read and delete accounts files. Note that account_rep does not have permission to read the accounts directory because bank policy is that account_rep does not need to be able to create a list of all account holders; similarly, account_rep does not have permission to write into an accounts file, because when an account is created or deleted, the initial deposit or final withdrawal from the account must be performed by a member of teller.

Similarly, the members of branch_manager have permission to read the accounts directory and accounts files, and to read and delete suggestion files, as noted above, while the members of employee have permission to read all employee files, but do not have permission to access files or directories associated with the OAT accounts.

The role/group financial_advisor is able to read the accounts directory, for example, in order to obtain a list of all account holders. This permission is necessary to implement bank policy, e.g., in order that financial_advisor can derive marketing information about current account holders in order to identify account holders who might be interested in the bank's uninsured investments. As members of financial-advisor need permission to open and close both insured and uninsured accounts, as also performed by account_rep, but have additional functions, RBAC's support of inherited roles is invoked so that financial_advisor inherits account_rep (as discussed in connection with FIG. 1); financial_advisor then has the permissions necessary to function as an account_rep.

Finally, the members of teller must have the permission to make changes (deposits and withdrawals) from the accounts files. Thus, teller has permission to traverse the accounts directory and read/write accounts files. Note that teller has no permission to create or delete files in the directory accounts, this being the responsibility of the account_rep.

In order for all roles/groups to be able to traverse the directory tree to access files for which they have permissions, all roles/groups have Execute permission on the directories assigned to the OAT cd_to_dir, such as the bank files directory.

It will thus be appreciated by those of skill in the art that the Object Access Type (OAT) entity defined according to the invention allows files and other objects to be grouped according to the permissions given the members of various roles with respect thereto. Stated somewhat differently, all of the objects assigned to a given OAT may be accessed identically by the members of each of the roles assigned to that OAT. Of course, the same objects may be assigned to more than one OAT, just as the members of a given role may be assigned differing permissions with respect to various groups of files by being assigned membership in differing OATs.

The user interface screens shown in FIGS. 2–5 can now be explained in more detail, to explain the use of the information depicted. Assume the files shown in FIGS. 2, 4, 5 are associated with Object Access Types as follows:

1. Directories a:\ and bank_files are associated with OAT cd_to_dir
2. Directory accounts and all of the files within this directory, i.e., *.acc are associated with OAT accounts
3. Directory empl_info, and files empl_services.txt and retirement_info.txt are associated with OAT employee_read
4. The files kb.sug, mb.sug, and tc.sug are associated with OAT suggestions The Object Access Type View screen of FIG. 2 permits files to be identified according to their Object Access Type. When RGP-Admin starts, it starts in the Object Access Type View and it is here that the matrix of role/groups, object access types and permissions is displayed. In the FIG. 2 example, as indicated in the window labeled Object Access Type, the files shown as green (i.e., by solid icons) all belong to the OAT employee_read. The permissions given members of employee to files in this OAT are indicated in the upper right window as (RWX)(R); i.e., members of employee can read, write, or execute directories associated with this OAT, but can only read files associated with this OAT. In the lower right window, the files empl_services.txt, and retirement_info.txt are shown in green, meaning that these files can be read by the members of employee; the remaining files cannot.

Figure 3:
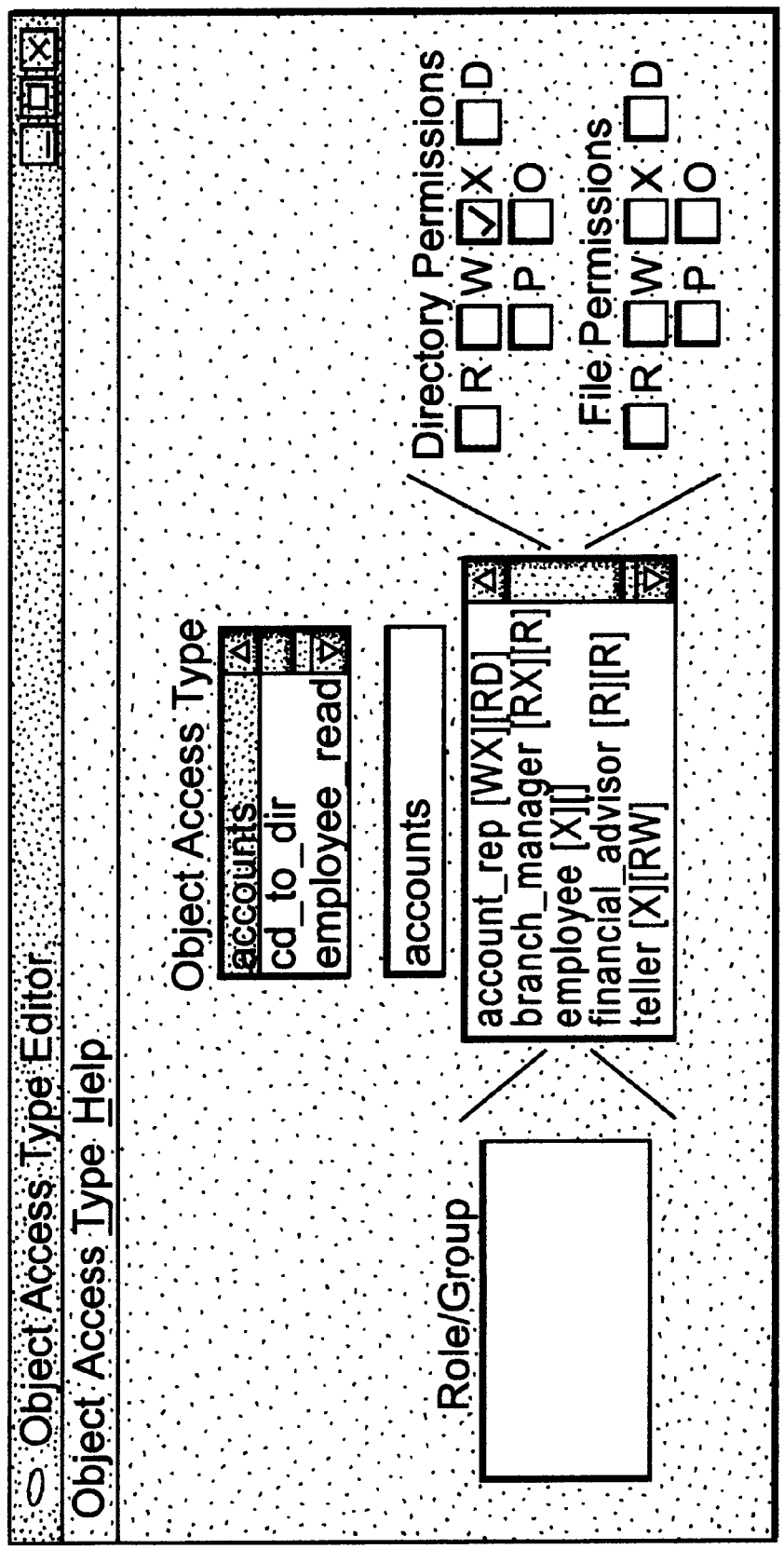
FIG. 3 is an example indicating how permissions assigned to an OAT are modified, using an Object Access Type Edit window.

The Object Access Type Editor of FIG. 3 allows the system administrator to create, edit, and remove Object Access Types. For example, the OAT accounts is shown as having been selected; when a role is selected from the list provided, the boxes on the right will be checked to indicate the permissions provided. To change these, the system administrator simply clicks on the appropriate boxes.

The Role/Group Permission View screen of FIG. 4 permits determination whether a particular role has a particular permission with respect to an identified file. The permission of interest is selected by checking the corresponding box. The example indicates that financial_advisor does not have Read permission for the files a:\bank files and empl_info, as their icons are shown in red, while financial_advisor does have Read permission for the directory accounts, the icon of which is shown in green.

Finally, a further user interface screen, the Role/Group Permission View screen of FIG. 5, allows determination of permission provided by a role's membership in a heirarchy. The example shown in FIG. 5 indicates that financial_advisor has Read permission (note that only Read permission is checked) with respect to the accounts directory as a result of the fact that, as defined in the accounts OAT, financial_advisor is given Read permission to a directory associated with the accounts OAT (see Table 1) and the accounts directory is associated with the accounts OAT. Note that, as a result of the definition of the accounts OAT, financial_advisor has no Read permission for files within the accounts directory (i.e., the *.acc files) which are associated with the accounts OAT. The Read permission for the files within the accounts directory is granted as a result of the fact that financial_advisor inherits account_rep, which has Read permission as a result of the definition of the accounts OAT. Also, financial_advisor has Read permission on the file empl_info as a result of the fact that financial_advisor inherits employee and employee has Read permission for all files associated with the employee_read OAT, as is the case for the file empl_info.

Thus, since in the FIG. 5 example, the Read permission is checked and hierarchy mode is checked, the files accounts, empl_info, and *.acc are shown in green, while the files a:\ and bank_files are shown in red, indicating that financial_advisor does not have Read permission to those files, even as a result of inheriting the roles account_rep and employee.

With this information, a person of ordinary skill in the art would have no difficulty in implementing the invention. While a preferred embodiment of the invention has been described, it will be appreciated by those of skill in the art that further enhancements and modifications thereto are possible.

In particular, while the invention has been discussed in detail in the Windows NT environment, and in an implementation in which the OATs effectively manage the access control lists provided thereby, numerous other implementations of the invention are possible. For example, as discussed above, the issue of access control also arises in connection with relational databases, which may be accessed from a variety of processors not necessarily conected in a network operated by a single operating system per se; access control lists are then typically associated with portions of the database and operated similarly. Implementation of the invention in this environment would typically be accomplished by allowing a system administrator controlling the server through which access to the database passes to define OATs as above.

The question of access control also arises in connection with objects stored such that they can be accessed over the "Internet" or "Web", i.e., such that they can be located by universal resource locator ("URL") inquiries; the "servers" storing the resources sought may similarly store ACLs for restricting access to various objects to individuals or groups of individuals. Again, implementation of the invention in this environment would typically be accomplished by allowing a system administrator controlling the server through which access to the resource sought must pass to define OATs as above. Finally, it is to be understood that the terminology "access control lists" as used herein and in the following claims includes conceptually similar mechanisms for access control, however labeled.

Accordingly, these and other modifications to the preferred embodiment disclosed herein are intended to be within the scope of the following claims where not specifically excluded thereby.

What is claimed is:

1. A method for improving access control administration in computer environments, the method comprising the steps of:
    associating individual users with roles or groups having identical access requirements to one or more sets of particular objects in the environment;
    creating an object access type (OAT) mechanism for managing a plurality of OATs, each OAT being a separate entity for associating one or more objects with one or more roles or groups and sets of object access permissions associated therewith; and
    employing said OATs to associate each said role or group with a specific set of permissions defining allowable accesses to a particular set of objects.

2. The method of claim 1, wherein each said OAT associates the permissions permitted to the corresponding individuals or groups of individuals assigned to said OAT to the objects or groups of objects assigned to said OAT by adding the identifications of said corresponding individuals or groups of individuals and the permissions permitted thereto to access control lists corresponding to each of the objects or groups of objects assigned to said OAT.

3. The method of claim 1, wherein said computer system comprises one or more discrete processor devices operated effectively as a single resource controlled by a single operating system, and wherein said operating system comprises means providing the capability to restrict access to objects or groups of objects by means of an access control list provided separately with respect to each said object or group of objects.

4. The method of claim 1, wherein said computer system comprises an undefined number of processor devices connected by reconfigurable connections, such that objects or groups of objects within said system may be located by universal resource locator (URL) inquiries, and wherein local processors controlling access to particular objects or groups of objects comprise means providing the capability to restrict access to objects or groups of objects by means of an access control list provided separately with respect to each said object or group of objects.

5. The method of claim 1, wherein said computer system comprises one or more discrete processor devices, and said objects are organized in a relational data base controlled by a server computer comprising means providing the capability to restrict access to objects or groups of objects by means of an access control list provided separately with respect to each said object or group of objects.

6. In a computer system comprising a plurality of objects controlled by means providing the capability to restrict access to objects or groups of objects by means of an access control list provided separately with respect to each said object or group of objects, whereby individuals or groups of individuals are listed on said access control lists together with a set of permissions authorized to the corresponding individuals or groups of individuals with respect to each of the objects or groups of objects to which said access control list corresponds, and wherein said access control lists are treated by said computer system as attributes of the corresponding objects or groups of objects, the improvement comprising:

providing a mechanism within said computer system whereby an Object Access Type (OAT) may be defined, said OATs being treated by said computer system as independent entities that may be created, edited, and/or deleted, separate from objects or groups of objects, and separately from individuals or groups of individuals;

said mechanism allowing said OATs to be assigned to or removed from objects and groups of objects, and allowing individuals or groups of individuals to be assigned to said OATs;

said mechanism further allowing each said OAT to contain lists of permissions permitted to the corresponding individuals or groups of individuals assigned to said OAT;

whereby each said OAT associates the permissions permitted to the corresponding individuals or groups of individuals assigned to said OAT to the objects or groups of objects assigned to said OAT.

7. The computer system of claim 6, wherein said OAT associates the permissions permitted to the corresponding individuals or groups of individuals assigned to said OAT to the objects or groups of objects assigned to said OAT by adding the identifications of said corresponding individuals or groups of individuals and the permissions permitted thereto to the access control lists of each of the objects or groups of objects assigned to said OAT.

8. The computer system of claim 6, wherein said computer system comprises one or more discrete processor devices operated effectively as a single resource controlled by a single operating system, and wherein said operating system comprises said means providing the capability to restrict access to objects or groups of objects by means of an access control list provided separately with respect to each said object or group of objects.

9. The computer system of claim 6, wherein said computer system comprises an undefined number of processor devices connected by reconfigurable connections, such that objects or groups of objects within said system may be located by universal resource locator (URL) inquiries, and wherein said means providing the capability to restrict access to objects or groups of objects by means of an access control list provided separately with respect to each said object or group of objects is provided by local processors controlling access to particular objects or groups of objects.

10. The computer system of claim 6, wherein said computer system comprises one or more discrete processor devices, and said means providing the capability to restrict access to objects or groups of objects by means of an access control list provided separately with respect to each said object or group of objects is a relational data base controlling access to particular objects or groups of objects.

* * * * *